United States Patent Office 3,353,077
Patented Nov. 14, 1967

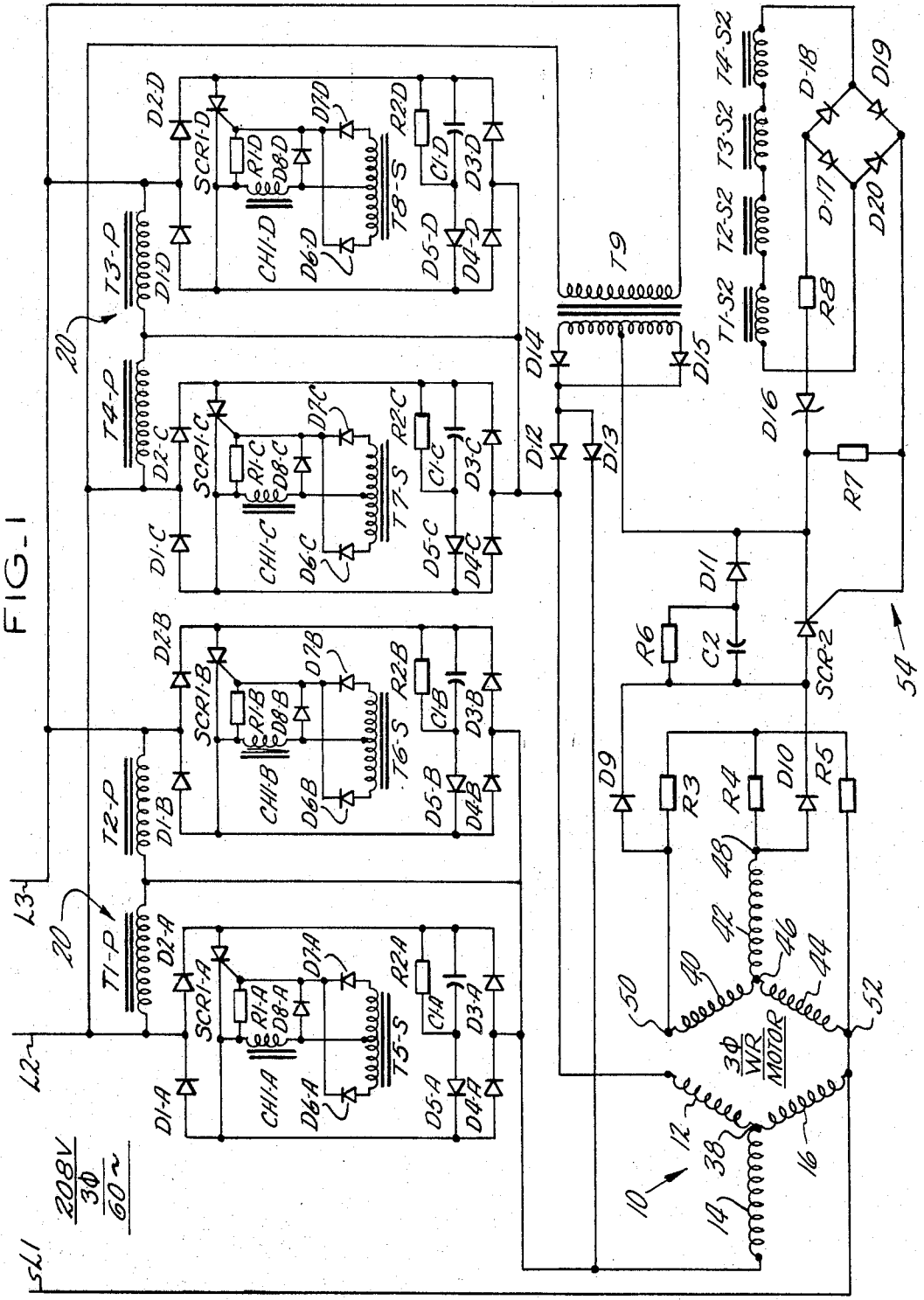

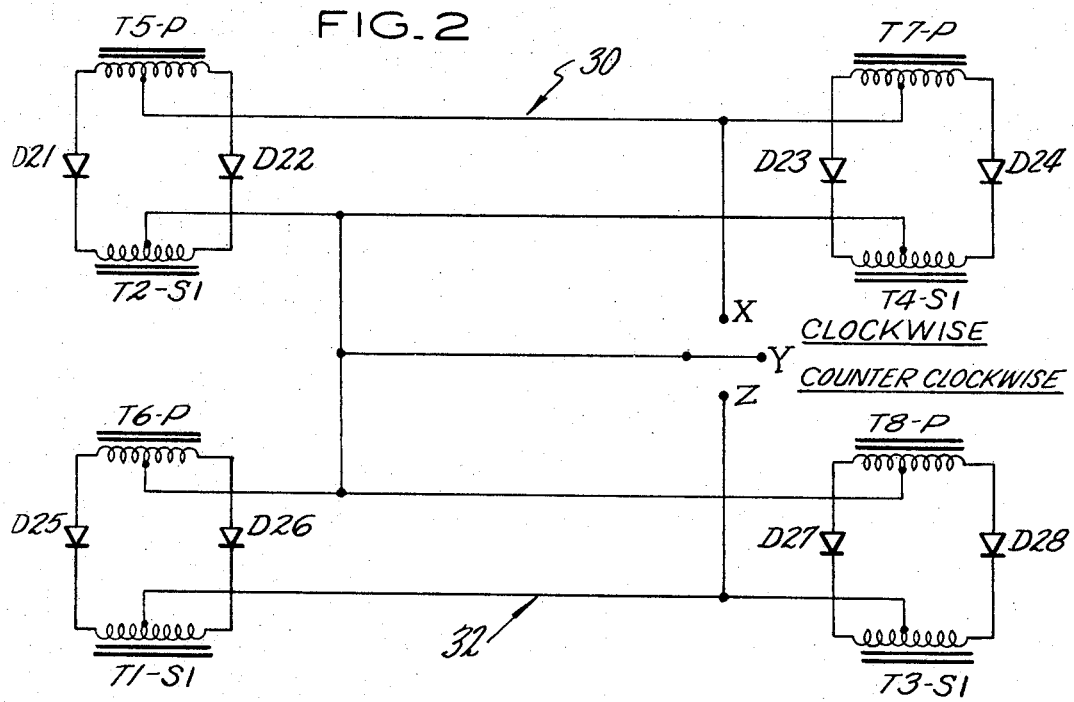
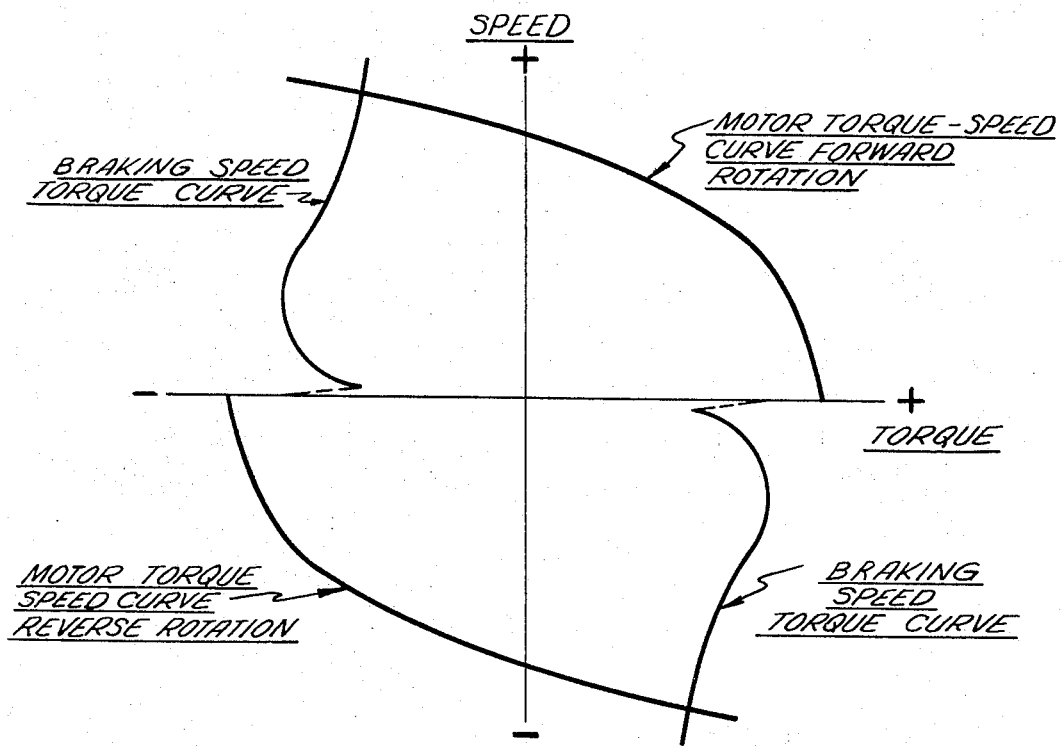

3,353,077
ELECTRICAL MOTOR DRIVE WITH DYNAMIC AND STATIC BRAKING
Robert W. Egglestone, West Hartford, and Algernon S. Noell, Jr., Windsor, Conn., assignors to Combustion Engineering, Inc., Windsor, Conn., a corporation of Delaware
Filed Dec. 28, 1964, Ser. No. 421,271
16 Claims. (Cl. 318—212)

This invention relates generally to an electric motor drive for providing a modulating control action for a control element and has particular relation to such a drive provided with electrical braking that is capable of rendering a braking action both while the motor is free wheeling and while the motor is stationary or in other words, provide both dynamic and static braking.

The electric motor drive of the invention finds particular application for control purposes which require operation of the drive in both the forward and reverse direction as normally required by an automatic controller and with the drive being suitable for rugged industrial and central power station use wherein it is essential that long life, low maintenance and high reliability be obtained. Such drives are required in power plant installations for controlling large valves and also for controlling dampers and the like for automatic boiler control. The drive of the invention is particularly suitable for use with a high efficiency actuator drive where the gear efficiency is such that the actuator is capable of back driving the motor wherefore the motor must have braking capability so as to prevent this back driving when it is desired for the valve or other controlled element to remain in a desired stationary position. These high efficiency actuators or gear boxes are advantageous in that they permit the use of low horsepower electric drives and improve the over-all performance of the motor and actuator as part of a control loop.

The electric motor drive of the invention utilizes a three-phase, wound rotor induction motor. There is provided a reversing line starter circuit to control the application of the three-phase power supply to the motor to provide for interruption of this supply when it is desired for the motor to remain stationary and to provide for interconnecting the three-phase supply with the motor in a relation that will drive the motor in the forward or the reverse direction. The details of this reversing line starter form the subject matter of a co-pending application filed concurrently herewith. A DC circuit is connected with the three-phase, wound rotor motor for supplying DC braking current to the motor. The control for this circuit is such that upon interruption of the application of driving potential to the motor the DC circuit is energized so that electrical braking of the motor is provided. The motor has its three field coils star connected and its three rotor coils also star connected with the rotor coils having conventional fixed resistances connected therewith and also in a star connection. One of the field coils is connected with one of the rotor coils in the DC circuit and the other two field coils as well as the other two rotor coils are connected in parallel with respect to the DC. With this arrangement good dynamic braking and static torque is provided.

It is an object of this invention to provide an improved electric motor drive.

Another object of this invention is to provide an improved electric motor drive having both good electrical dynamic and static braking.

A still further object of this invention is to provide such an improved electric motor drive wherein the electric dynamic and static braking is automatically applied incident to the cessation of the application of driving potential to the motor.

A still further object of the invention is to provide such an improved electric motor drive wherein the novel DC circuit is utilized to obtain good braking both while the motor is stationary and while it is rotating.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIGURES 1 and 2, taken together, comprise a circuit diagram of the invention; and FIGURE 3 is a set of curves showing the braking torque that is developed with the invention.

Referring now to the drawings wherein like reference characteristics are used throughout to designate like elements, the illustrative embodiment of the invention depicted therein includes the three-phase wound rotor motor 10 which is provided with field coils 12, 14 and 16 with one end of each of these field coils being connected to the star connection 38. The rotor or secondary of the motor is provided with coils 40, 42 and 44 with these coils having one end connected to the star connection 46. Field coil 16 is connected with the phase L1 of the three-phase power supply. Field coils 12 and 14 may be connected with either the phase L2 or L3 of the power supply through the reversing line starter control circuit described in detail hereinafter and which is effective to either block the passage of current from L2 and L3 to the coils 12 and 14 or to connect these coils with these power supply phases for either forward or reverse rotation of the motor.

The wound rotor of the motor uses conventional fixed secondary resistances R3, R4 and R5 which are star connected into the rotor secondary.

The DC braking circuit for providing dynamic and static electric braking of the motor includes the transformer T9 which is wound with a desired ratio to provide the required voltage on the transformer secondary. Rectification of the transformer output is achieved by the diodes D14 and D15 with the transformer secondary being of center tap construction. The DC current flow thus produced follows a path as follows: a parallel path through field coils 12 and 14 to the star connection 38; a series path from the star connection through field coil 16 to the outer terminal 52 of coil 44; the following combined parallel paths from terminal 52; through R5 and R4 to the outer terminal 48 of coil 42, through R5 and R3 to the outer terminal 50 of coil 40; through rotor coil 44 to star connection 46 and then in parallel through rotor coils 42 and 40 to the outer terminals 48 and 50 of these coils; these outer terminals 48 and 50 are common potential points and the current flows from these terminals in parallel through diodes D9 and D10 to the silicon controlled rectifier SCR 2; from SCR 2, which serves as a switch in the DC circuit, the current flows to the center tap of the secondary of transformer T9.

This DC current provides two fields, one in the starter of the motor and one in the rotor of the motor. These are stationary fields and represent two magnetic pole configurations corresponding to the number of poles for which the motor is wound with adjacent poles being of opposite polarity. This effectively maintains the motor in synchronism at zero speed similar to a synchronism relationship of an AC synchronous motor. The static torque developed by the motor occurs when the rotor shaft is displaced in either the clockwise or counterclockwise direction. The field of the starter and rotor tend to return the motor to the mid-position thereby supplying the static holding torque as mentioned hereinbefore.

The dynamic braking torque or torque developed by the motor when it is rotating in a free-wheeling fashion, i.e., without the driving potential being applied, uses the same DC excitation path created by the DC power supply through transformer T9 with the DC output of this transformer being supplemented by the generator action of the motor which tends to increase the motor current flowing through the DC circuit. In other words, there are two electrical potential sources of dynamic braking, one the transformer T9 and the other the wound rotor motor. The current path described is the same as previously described. However, the currents flowing are not simple DC arrangements but DC currents superimposed with AC currents. To obtain dynamic braking, power dissipation must occur transferring the rotating energy into heat. This is created by the following circuit loops: in the motor primary the loop comprising coil 14 to the star connection 38, coil 12 and then through rectifiers D12 and D13 back to coil 14 and in the opposite direction through coil 12 to star connection 38, through coil 14 and then through diodes D13 and D12 with this representing the reverse path. It is to be noted that in the forward just described the path through diode D12 is in the reverse direction of the diode but this represents an AC current flow in this loop with the magnitude of the AC being limited by the DC forward bias current of D12. The DC forward bias of D13 also allows an AC to flow in the reverse direction through diode D13.

The primary loop as described above becomes a nonlinear path in resistance if the generated voltage in the primary should circulate a current which exceeds the DC bias level. Hence the rectifiers D13 and D12 will limit the maximum AC current flowing in the primary. This is important since it limits the magnitude of demagnetizing flux created by this eddy current path which has a total resistance in the low current values approximately equal to that of the primary windings 12 and 14 of the motor.

This non-linear action or limiting of the current flow by the diodes D12 and D13 is effective when the motor is free-wheeling or coasting at high speeds but provides a very low resistance path when the motor speed is low or approaching zero r.p.m. In order to obtain high braking torque in the low motor speeds, the eddy current paths must have a lower total resistance since the generated voltage is low and the torque is proportional to the current flow and field strength. Because of the DC current passing through the secondary or rotor of the motor, as the secondary rotates a voltage will be developed in the primary. Furthermore, since there is DC current passing through the primary, rotation of the secondary will induce a voltage into the secondary winding. There are several eddy current loops in the secondary winding and they can be described as follows: from terminal 48 through R4 and R3 to terminal 50 and then through motor windings 40 and 42 back to terminal 48; from terminal 48 through R4 and R5 to terminal 52, then through motor windings 44 and 42 back to terminal 48; from terminal 52 through R5 and R3 to terminal 50 and then through motor windings 40 and 44 back to terminal 52; from terminal 48 through diode D10 and diode D9 to terminal 50 and then through windings 40 and 42 back to terminal 48. These are the major loops and while other paths can be found the currents therein will be comprised of currents within these four loops. The generated voltage in the motor secondary will cause current to circulate in these loops. One of the loops which includes diodes D10 and D9 also has non-linear resistance characteristics as described with regard to the motor primary. The other secondary loops have part of the secondary resistances R3, R4 or R5 in them which represents a relatively high resistance to the eddy current paths and limits the amount of demagnetization created by the AC current flow when the motor is rotating at high speed.

The previously described eddy current loops are concerned with the primary and secondary, respectively, of the motor. There is also a major loop for AC current flow which is identical to the DC current flow loop previously described. It is this major loop with the blocking action of the rectifiers D9, D10, D12 and D13 which increases the DC bias and hence the motor excitation during time rotation of the motor is taking place. This increase in current is substantial and in many cases exceeding the DC level applied, i.e., a DC is obtained which is in excess of 200 percent of steady state DC applied.

Within the DC circuit for applying DC braking current to the motor there is provided capacitor C2 which is for the purpose of limiting surge voltage applied to the switch device SCR2. Resistance R6 connected across this capacitor is for the purpose of dissipating any charge that is accumulated on the capacitor and the diode D11 is provided to prevent a high current discharge of capacitor C2 through SCR2 should this SCR be switched on at a time that the capacitor is charged.

The method of applying and removing the DC excitation from the motor includes a circuit identified generally as 54 with this circuit, when energized being effective to gate SCR2 and thus complete the DC braking circuit. The energization of this circuit is interlocked with the reversing line starter control circuit such that the circuit 54 is not energized when driving power is applied to the motor through the line starter circuit but is automatically energized when the line starter circuit occupies a current blocking state so that the three-phase line potential is not applied to the motor.

The control circuit 54 includes a potential source in the form of secondaries T1–S2, T2–S2, T3–S2 and T4–S2 which are secondaries of transformers the primaries of which are connected in the reversing line starter circuit. The AC produced by these secondaries is rectified by the diodes D17, D18, D19 and D20 connected into a bridge network with one side of the bridge being connected to the cathode of the silicon controlled rectifier SCR2 through the zener diode D16 and resistor R8, the other side being connected to the gate of SCR2. The zener diode D16 has the characteristic or in other words the limiting value below which it will not conduct such that all four of the transformer primaries must be energized in order for the circuit 54 to be energized, i.e., conduct current. If less than four of the transformer secondaries are energized, the potential that is developed is below the conducting potential of the zener diode and the circuit remains non-conducting and accordingly SCR2 is not gated. This arrangement provides an interlock, as will be apparent as the description proceeds, such that the reversing line starter control circuit must be conditioned so as to prevent driving power being supplied to the motor before the switch device SCR2 is gated to a conducting state and thus the DC braking circuit energized. Moreover, with the organization of the invention this DC energization will automatically occur when the reversing line starter control is conditioned to prevent the supplying of driving potential to the motor.

Referring now specifically to the reversing line starter, this control circuit includes a pair of switching systems, one system being designated generally 18 while the other is designated generally 20. Each of these systems includes a pair of switching means with the system 18 having switching means 22 and 24 and the system 20 having switching means 26 and 28. Each of these last-mentioned switching means are of similar construction so that switching means 26 will now be described with the suffix A being used for the components of this switching means while the suffix B applies to the components of switching means 22, the suffix C to the components of switching means 24, and the suffix D to the components of switching means 28.

Coming back to the switching means 26 there is included therein SCR1–A (silicon controlled rectifier) connected across a rectifier bridge that includes diodes D1–A, D2–A, D3–A and D4–A. This bridge is interposed between phase L2 of the power supply and coil 14 of the motor and as thus connected into this bridge, the SCR1–A serves as an AC switch notwithstanding that it carries unidirectional current. The SCR1–A thus acts as a switch interconnecting phase L2 of the power supply with field coil 14 of the motor. The capacitor C1–A serves as a voltage surge suppressor limiting the transient voltage available for application to SCR1–A and the diodes D1–A, D2–A, D3–A and D4–A. The resistor R2–A provides a discharge path for the capacitor C1–A and the diode D5–A provides protection against high discharge current from C1–A flowing through SCR1–A should this SCR be gated while a charge is present on the capacitor C1–A. Each of the switching means 22, 24 and 28 has the same components as the switching means 26 just described with the bridge of switching means 22 being interposed between phase L3 of the power supply and coil 14 of the motor and the bridge of switching means 24 and 28 being interposed between phase L2 and coil 12 and phase L3 and coil 12, respectively.

A reversing line starter used in conjunction with a three-phase power supply must have a control circuit which is interlocked or which has an interlocking function in order to prevent simultaneous excitation or closing of contactors which could create a line-to-line short circuit. In the instant illustrative embodiment since coil 14 of the motor is connected with phase L2 of the power supply through switching means 26 and with phase L3 through switching means 22 while coil 12 is connected with phase L2 through switching means 24 and phase L3 through switching means 28, it is apparent that simultaneous gating of SCR1–A and SCR1–B will result in a short circuit between phases L2 and L3 of the power supply and a similar short will exist as a result of simultaneous gating of SCR1–C and SCR1–D. The oragnization of the present invention prevents such simultaneous gating of the SCR's and provides for an interlock effective to insure against this happening. This interlock is obtained by utilizing the source voltage across SCR1–A for firing SCR1–B; the source voltage across SCR1–B for firing SCR1–A; the source voltage across SCR1–C for firing SCR1–D; and the source voltage across SCR1–D for firing SCR1–C.

To explain this more fully, the gating circuit for each of the switching means 22, 24, 26 and 28 includes a resistor R1–A (with reference to switching means 26) connected across the SCR between the gate and cathode. A transformer secondary T5–S is connected into a rectifying network D6–A and D7–A with the transformer secondary having a center tap such that DC current is applied to the SCR for firing the same upon energization of the transformer secondary. Diode D8–A is connected into this gating circuit in order to keep transients from gating the SCR and the inductance or choke CH1–A is connected into the gating circuit to smooth out the pulsating DC in order to give minimum gating current. The transformers for the gating circuits of the switching means 22, 24 and 28 have secondaries identified as T6–S, T8–S and T7–S, respectively, while the remainder of these gating circuits are similar to that just described for switching 26 and the components are identified with the letters B, C and D, respectively. The primaries of these transformers are part of a control circuit which for purposes of clarity is shown in FIGURE 2.

This circuit has a first portion 30 which when activated will cause firing of SCR's 1–A and 1–D or in other words, switching on of the pair of switching means 26 and 28 which make up the switching system 20. This will connect field coil 14 of motor 10 with phase L2 of the power supply and coil 12 with phase L3 thus driving the motor in one direction. The second circuit portion 32 of the control circuit will gate SCR's 1–B and 1–C or, in other words, activate the switching means 22 and 24 to reverse the connection of the field coils 12 and 14 and thus drive the motor in the opposite direction.

The control circuit portion 30 includes the transformer secondary T2–S interconnected with the transformer primary T5–P via diodes D21 and D22. It also includes the transformer secondary T4–S interconnected with the transformer primary T7–P via the diodes 23 and 24. The center taps of the transformer primaries T5–P and T7–P are connected with the switching element or contact X while the center taps of the transformer secondaries T2–S and T4–S are connected with the contactor or switching element Y. The primary for the transformer secondary T2–S is connected across the switching means 22 from power supply phase L3 to the field coil 14 and is identified as T2–P while the primary for transformer secondary T4–S is connected across the switching means 24 from power supply phase L2 to field coil 12 and is identified as T4–P. These transformer primaries T2–P and T4–P will be energized when SCR1–B and SCR1–C respectively are not gated or are in a current blocking state. When SCR1–B is energized the voltage appearing across the switching means 22 is the forward drop of D2–B, D4–B and SCR1–B or D1–B, D3–B and SCR1–B. This voltage drop is not of sufficient magnitude to supply the necessary current to gate SCR1–A. In effect the gating of SCR1–B acts as a short circuit across the transformer primary T2–P. A similar relationship applies to transformer primary T4–P associated with SCR1–C.

If it is assumed that SCR1–B and SCR1–C occupy a current blocking state, then engaging contact Y with contact X will cause energization of the transformer secondaries T2–S and T4–S which in turn will, through transformers T5 and T7 establish gating currents in the gating circuits for SCR1–A and SCR1–D respectively thus connecting the motor with the power supply in order to drive the motor in one direction.

The second control circuit portion 32 is arranged similarly to control circuit portion 30 with transformer secondary T1–S being interconnected with transformer primary T6–P through diodes D25 and D26 and transformer secondary T3–S being interconnected with transformer primary T8–P through diodes D27 and D28. The center taps of transformer primaries T6–P and T8–P are connected with the contactor Y while the center taps of transformer secondaries T1–S and T3–S are connected with contactor Z. The transformer secondaries T1–S and T3–S are associated with the transformer primaries T1–P and T3–P with these latter primaries being connected across the bridge or switching means 26 and 28 respectively. Thus, this second control circuit portion establishes an interlock such that gating current may be supplied to gate SCR1–B and SCR1–C provided SCR1–A and SCR1–B, respectively, are in their current blocking position. With this control arrangement it can be seen that it is not possible to simultaneously gate SCR1–A and SCR1–B nor is it possible to simultaneously gate SCR1–C and SCR1–D thereby providing a positive interlock preventing a direct short between the phases L2 and L3 of the power supply while at the same time providing a control circuit for effectively reversing the application of these two phases to the motor in order to provide for driving the motor in either the forward or the reverse direction.

It will be appreciated that the contactors X, Y and Z are only diagrammaticaly represented with these contactors preferably being static solid state components that receive signals from actuators or sensing elements such as means sensing the megawatt output steam flow temperature or the like in a power plant and provide a signal for driving motor 10 in the desired direction to a desired position to provide the required control action.

The transformers T1, T2, T3 and T4 are each provided with a single primary and two secondary windings. The secondary windings are identified in the control circuit portions 30 and 32 and in the control circuit 54 with these windings being identified in this latter circuit as T1–S2, T2–S2, T3–S2 and T4–S2. Since, as previously explained, it is necessary that all four of these last-mentioned secondary windings have an induced voltage therein produced incident to energization of the primaries in order to reach the conducting potential of zener diode D16, it is apparent that the reversing line starter location must be in the condition such that driving potential is not supplied to the motor 10 before the SCR2 can be gated on and the DC braking potential applied to the motor. This interlock prevents a simultaneous application of driving and braking potential to the motor 10.

The effect of the application of braking potential to the motor is depicted in FIGURE 3 wherein curves are set out showing the dynamic braking action that is obtained with the invention and with the motor free-wheeling in either the forward or the reverse direction.

While we have illustrated and described a preferred embodiment of our invention it is to be understood that such is merely illustrative and not restrictive and that vartions and modifications may be made therein without departing from the spirit and scope of the invention. We therefore do not wish to be limited to the precise details set forth but desire to avail ourselves of such changes as fall within the purview of our invention.

What we claim is:

1. An electric motor drive providing electric static and dynamic braking and comprising in combination a three-phase wound rotor induction motor, means for controllably supplying driving potential to the motor, means for supplying a DC braking current to the motor this last named means including a circuit into which is connected a source of potential, said circuit having the field coils of the motor connected thereinto with two of these coils being parallel connected and the remaining coil being series connected with these two, one of the coils of the rotor being series connected with said remaining field coil and the other two coils of the rotor being series connected with said one coil of the rotor but in parallel with each other, means to control the passage of DC current through the motor from said source and interlock effective to prevent the passage of DC braking current to the motor from said source when driving potential is supplied to the motor.

2. The electric motor drive of claim 1 wherein the means to control the DC current passing through the motor includes a silicon controlled rectifier, a gating circuit for said silicon rectifier and means for energizing said gating circuit incident to termination of the supply of driving potential to the motor by the means for controlling such driving potential.

3. An electric motor drive comprising in combination a three-phase wound rotor induction motor, a source of DC potential including a transformer the primary of which is connected to an AC source and a secondary of which is provided with rectifier means to produce DC current, said motor having three field coils one terminal of each being star connected and three rotor coils one terminal of each being star connected, two of said field coils having their other terminals connected to the DC source, the remaining field coil having its other terminal connected with the other terminal of one of the rotor coils the other terminals of the rotor coils being connected with the DC source and means operative to control the passage of DC current from the source through the field and rotor coils.

4. The electric motor drive of claim 3 wherein the rotor coils have their other terminals connected with fixed resistances which are in turn star connected.

5. The electric motor drive of claim 3 including a diode in the connections of said other terminals of said field coils with said DC source and diodes in the connection of the other terminals of said rotor coils with the DC source with said diodes permitting the passage of DC current through said coils from said source.

6. An electric motor drive comprising in combination a three-phase wound rotor induction motor having three field coils one terminal each of which is star connected and three rotor coils one terminal each of which is star connected, means for controlling the application of a three-phase electric driving potential to the motor, a DC braking circuit for the motor comprising a DC source, one of the field coils being series connected with one of the rotor coils, the other two field coils and the other two rotor coils being in parallel and connected to the DC source, fixed resistances being star connected with the rotor coils, diodes being disposed in the parallel connections of the field coils with the DC source and the rotor coils with the DC source, and means controlling the passage of DC current from the DC source through the motor.

7. The electric motor drive of claim 6 including means preventing the passage of DC current through the motor incident to the control for the three-phase potential being conditioned to apply the three-phase potential to the motor.

8. The electric motor drive of claim 7 wherein the control for the passage of DC through the motor includes a silicon controlled rectifier, a gating circuit for the silicon controlled rectifier including a zener diode, a plurality of transformers the secondaries of which have a rectifying circuit associated therewith for rectifying the AC developed therein and applying it to the gate of the silicon controlled rectifier through the zener diode, said means for controlling the application of the three-phase supply to the motor including a plurality of switching means, each of the switching means having the primary of one of the transformers connected thereacross such that the transformer primaries are energized when said switching means are in a current blocking condition, said zener diode being of such magnitude as to require at least a majority of the transformer secondaries to be energized in order for the zener diode to conduct and thus permit the silicon controlled rectifier to be gated.

9. An electric motor drive comprising in combination a three-phase wound rotor induction motor having three field coils one terminal of each being star connected and three rotor coils one terminal of each being star connected, means to control the application of a three-phase electrical supply to the motor including a first pair of switching means interconnecting the other terminal of two of the field coils with two phases, respectively, of the supply and a second pair of switching means interconnecting these same field coils with these same phases but in reverse relation, each of the switching means having a current conducting and a current blocking condition, a transformer connected across each of the switching means with the primary being thus connected, a DC circuit for controllably passing DC braking current through the motor and including a DC source, two of the field coils being parallel connected and the third being series connected in this circuit, one of the rotor coils being series connected with said other field coil and the other two rotor coils being parallel connected in said circuit, switch means in said circuit to control the passage of DC current therethrough, and electric means to control said switch means including a circuit having connected therein the secondaries of said transformers and being effective to cause the switch means to occupy a conducting condition when at least three of said secondaries are energized and to occupy a current blocking position when less than three of said secondaries are energized.

10. The electric motor drive of claim 9 wherein said switching means comprises a silicon controlled rectifier connected into said circuit and wherein the control means includes a circuit for gating the silicon controlled rectifier with the circuit including a zener diode and a rectifying network to rectify the output of the transformer secondaries.

11. An electric motor drive comprising in combination a three-phase wound rotor induction motor having three field coils star connected and three rotor coils star connected, fixed resistances connected in star fashion with the rotor coils, means to control the application of a three-phase electric potential to the motor including a first pair of switching means interconnecting the other terminal of two of the field coils with two phases, respectively, of said potential and a second pair of switching means interconnecting the same field coils with the same two phases but in reverse relation, each of the switching means having a current conducting and a current blocking condition, a transformer connected across each of the switching means with the primary being thus connected, a DC circuit for controllably passing DC braking current through the motor and including a DC source, two of the field coils being parallel connected with the third being series connected in said circuit, one of the rotor coils being series connected with said other field coil and the other two rotor coils being parallel in said circuit, diodes in the parallel connection of the two field coils, diodes in the parallel connection of the two rotor coils, switch means in said circuit to control the passage of DC current therethrough, and electric means to control said switch means including a circuit having connected therein the secondaries of said transformers and being effective to cause the switch means to occupy a conducting condition when at least three of said secondaries are energized and to occupy a current blocking position when less than three of said secondaries are energized.

12. An electric motor drive comprising a three-phase wound rotor induction motor, means operative to apply a DC braking current to the windings of said motor, the stator windings of said motor being series connected with the rotor windings for the application of this DC current to both stator and rotor windings, means effective to control the application of driving potential to said motor operative to controllably supply and interrupt the same, and means responsive to an interruption of the application of said driving potential to said motor by said control and effective to automatically apply the DC braking current to said motor causing said current to be supplied to said motor when said driving potential is interrupted and causing a cessation of said braking current when said driving potential is supplied to said motor.

13. An electric motor drive comprising in combination a three-phase wound rotor induction motor, means for supplying a three-phase potential to said motor including three supply lines, regulating means effectively connecting two of said supply lines with said motor and having a first condition connecting said two lines in a first relation, a second condition connecting said two lines in a reverse relation and a third condition interrupting the connection of said two lines with said motor, a braking circuit connected with said motor to supply a DC braking current thereto, said circuit including the field and rotor coils of the motor interconnected to provide both dynamic and static braking incident to application of said DC thereto, control means forming a part of said braking circuit, a supply of potential for said braking circuit and means automatically operative to actuate said control means responsive to the condition of said regulating means to cause said control means to interrupt the supply of potential to the braking circuit when the regulating means is in a condition other than the interrupting condition and to automatically cause said control means to apply said potential to said braking circuit when the first mentioned control means is in a circuit interrupting condition.

14. An electric motor drive for a modulating control comprising a three-phase wound rotor induction motor, circuit means for controlling the application of driving potential to said motor including switch means having a first operating condition where it is effective to supply driving potential to the motor to drive it in one direction and a second operating condition where it is effective to supply driving potential to said motor to drive it in the opposite direction and a third operating condition where it is effective to interrupt the supply of driving potential to said motor, a static and dynamic electric braking system for said motor including a circuit for supplying DC current to the motor and including a source of supply and control means to interrupt and complete this circuit said control means including a circuit having means generating a potential the magnitude of which depends upon the condition of said switch means and being effective to produce a potential of one value when said switch means is in a condition to supply driving potential to the motor and of another value when in a condition to interrupt such supply, and means responsive to this potential effective to apply said DC current to said motor when said potential is at said other value and to terminate this supply of DC current to said motor when said potential is at said one value.

15. An electric motor control drive for providing a modulating type of control and for rendering a dynamic and static braking action comprising in combination a three-phase wound rotor induction motor, a circuit connected within said motor for supplying DC braking current thereto and including a source of potential and a switching control means, means for controlling said switching control means including an electrical potential source which when of a predetermined magnitude causes the switching means to complete said circuit while when below said magnitude causes the switching means to interrupt said circuit, means operative to regulate the supply of driving potential to said motor having an operating condition where it is effective to interrupt this potential supply to the motor and means effectively responsive to said regulating means to automatically adjust the potential supplied to said switching means and operative when said regulating means occupies a circuit interrupting position to supply sufficient potential to said switching means to cause it to occupy a circuit completing condition while when said regulating means is in any other condition said potential is insufficient to cause the switching means to be changed from the circuit interrupting to the circuit completing condition.

16. The electric motor control drive of claim 15 wherein the means for controlling the switching control includes a plurality of elements which, when energized, produce said potential of predetermined magnitude and a voltage responsive member effective to cause the switching means to complete said circuit when said predetermined voltage is present but to interrupt said circuit when said predetermined voltage is not present, said means for regulating the supply of driving potential to said motor being effective to energize each of said elements when this last-mentioned means is in the operating condition where it interrupts the potential supply to the motor and to de-energize at least some of said means when in the operating condition to supply potential to said motor.

References Cited
UNITED STATES PATENTS

| | | | |
|---|---|---|---|
| 2,709,236 | 5/1955 | Huelsman | 318—212 X |
| 2,733,393 | 1/1956 | Carlisle | 318—203 |
| 3,253,202 | 5/1966 | Cotton | 318—227 |

ORIS L. RADER, *Primary Examiner.*

G. Z. RUBINSON, *Assistant Examiner.*

UNITED STATES PATENT OFFICE
CERTIFICATE OF CORRECTION

Patent No. 3,353,077                  November 14, 1967

Robert W. Egglestone et al.

It is hereby certified that error appears in the above numbered patent requiring correction and that the said Letters Patent should read as corrected below.

Column 7, line 41, for "interlock" read -- interlock means --.

Signed and sealed this 18th day of March 1969.

(SEAL)
Attest:

Edward M. Fletcher, Jr.                  EDWARD J. BRENNER
Attesting Officer                       Commissioner of Patents